United States Patent [19]

Smith

[11] 4,163,638

[45] Aug. 7, 1979

[54] MATERIAL DISTRIBUTION APPARATUS FOR CONTINUOUS FLOW MATERIAL SOURCE

[76] Inventor: Teddy V. Smith, 13437 Kit La., Dallas, Tex. 75240

[21] Appl. No.: 826,393

[22] Filed: Aug. 22, 1977

[51] Int. Cl.[2] .................... B29C 3/06

[52] U.S. Cl. .................... 425/131.1; 425/145; 425/224; 264/40.7; 264/113

[58] Field of Search .................... 425/131.1, 143, 145, 425/219, 130, 224, 257; 264/113, 40.7

[56] References Cited

U.S. PATENT DOCUMENTS

| | | | |
|---|---|---|---|
| 2,052,324 | 8/1936 | Thomson | 425/224 X |
| 2,756,459 | 7/1956 | Kellner | 425/224 X |
| 3,247,295 | 4/1966 | Barwell | 425/145 X |
| 3,872,199 | 3/1975 | Ottinger | 425/224 X |
| 3,995,980 | 12/1976 | Smith | 425/219 |
| 4,017,223 | 4/1977 | Keusgen et al. | 425/145 |

*Primary Examiner*—Robert L. Spicer, Jr.

*Attorney, Agent, or Firm*—Warren H. Kintzinger

[57] ABSTRACT

An apparatus useful in manufacturing a continuously extruded running length of construction paneling from continuous flow material sources. The material distribution system, operating in concert with intermittent advance motions of a material conveyor, provides even layer material distribution from the continuous flow sources.

6 Claims, 16 Drawing Figures

Figure 1:
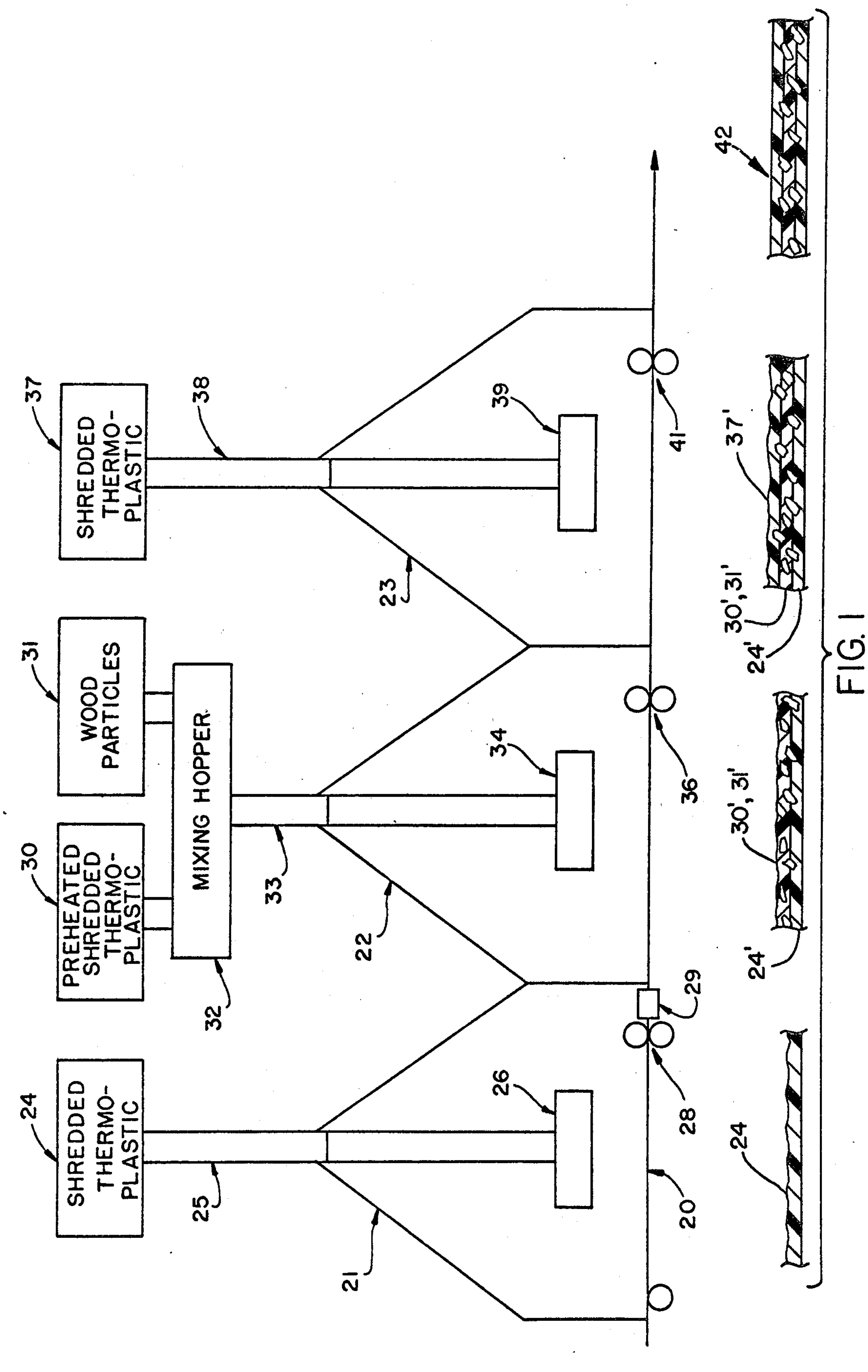

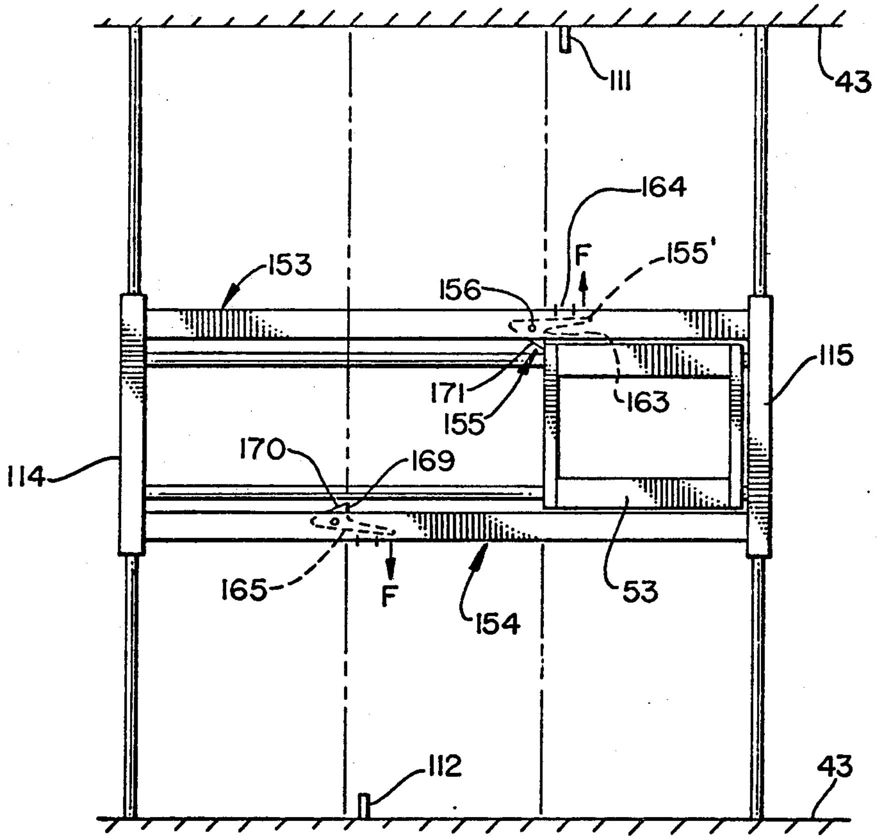
FIG. 11
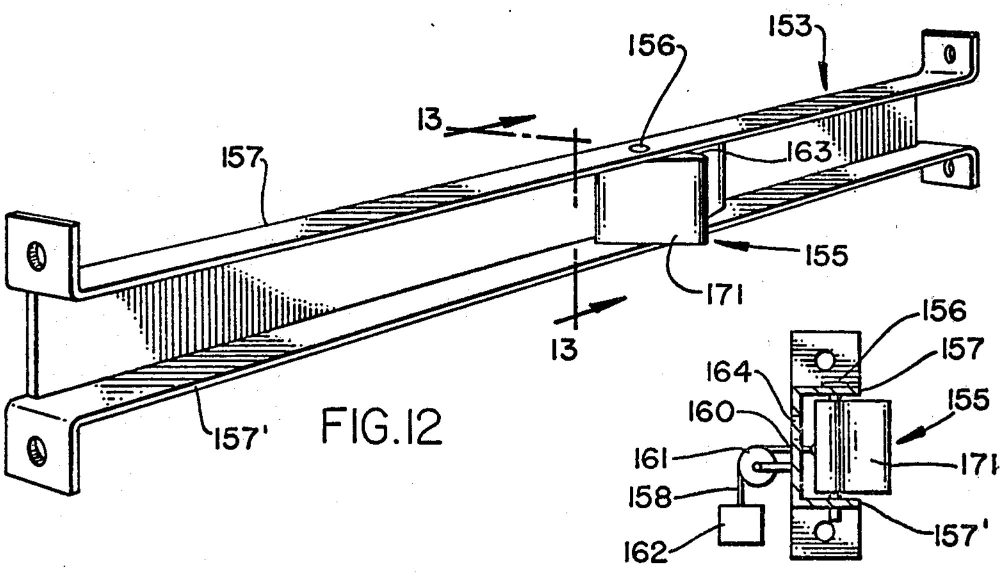
FIG. 12
FIG. 13

MATERIAL DISTRIBUTION APPARATUS FOR CONTINUOUS FLOW MATERIAL SOURCE

RELATED U.S. APPLICATION

This invention relates in general to construction industry products, and in particular to an apparatus useful in manufacturing a new and useful wall panel product of the type described in my application Ser. No. 625,897, filed Oct. 28, 1975, now U.S. Pat. No. 3,995,980 dated Dec. 7, 1976.

Conventional wall construction has long utilized studding and framing, with surface material of one type or another placed thereover to complete the wall. Conventional hollow-wall construction techniques employ the use of expensive wood framing materials (i.e., dimension lumber), to arrive at a structurally rigid wall structure having load-carrying capabilities. The conventional framing is surfaced with sheetrock, wood paneling, or other planar materials, resulting in time-consuming construction with attendant appreciable expense.

Often, the expense of conventional housing construction denies adequate housing. Also denying housing to many, is the shortage of lumber and paneling materials. Methods for overcoming the time-consuming construction and the high cost of conventional wall panels have included various wall paneling materials using cellulose fiber materials and a bonding agent. Thermoplastics have been used in wall panels in the form of foaming urethanes. Generally these products and the methods by which they are manufactured do not provide cost reduction, because the materials are expensive and the cost of manufacture precludes a low-priced product.

The present invention is useful in the manufacture of a new and useful wall panel product of a type that may be manufactured by a continuous extrusion process utilizing, as raw materials, those materials heretofore considered to be discardable waste products, namely, discarded thermoplastic bottles, toys, tires, cartons, containers, etc., and cellulose fiber products, such as shredded tree bark.

It is therefore a principal object of this invention to provide apparatus useful in making a new wall panel product, with the panels being rapidly producible from extremely low-cost raw materials, and which wall paneling will vastly reduce both home building and commercial construction time and costs.

A further object of the invention is to provide an apparatus useful in the construction of wall panels economically, from reconstituted waste materials.

Another object of the invention is to provide an apparatus useful in mixing reconstituted thermoplastic material and wood particles of regular or irregular size, under controlled conditions, to produce wall panels of specific size and shape, and having improved characteristics of strength, durability, corrosion resistance, repairability, and insulating qualities, as compared to conventional wood frame walls.

Features of this invention useful in accomplishing the above objects include, (in an apparatus for continuously extruding a running length of construction wall paneling, by a process including heat fusing a first layer of shredded thermoplastic material, pressure rolling the first layer, distributing an intermediate layer of shredded thermoplastic material mixed with cellulose fiber particles, in an oven environment, pressure bonding the intermediate layer onto the first layer, and distributing a top layer of shredded thermoplastic over said intermediate layer, in a heated environment, followed by further pressure bonding of the three-layer product) a distribution system for effecting dry material distribution from continuously flowing material sources.

A specific embodiment representing what is presently regarded as the best mode for carrying out the invention is illustrated in the accompanying drawings:

In the drawings:

FIG. 1 illustrates, by way of diagrammatic flow diagram, a process for making a product from continuously flowing dry raw material sources.

Figure 2:
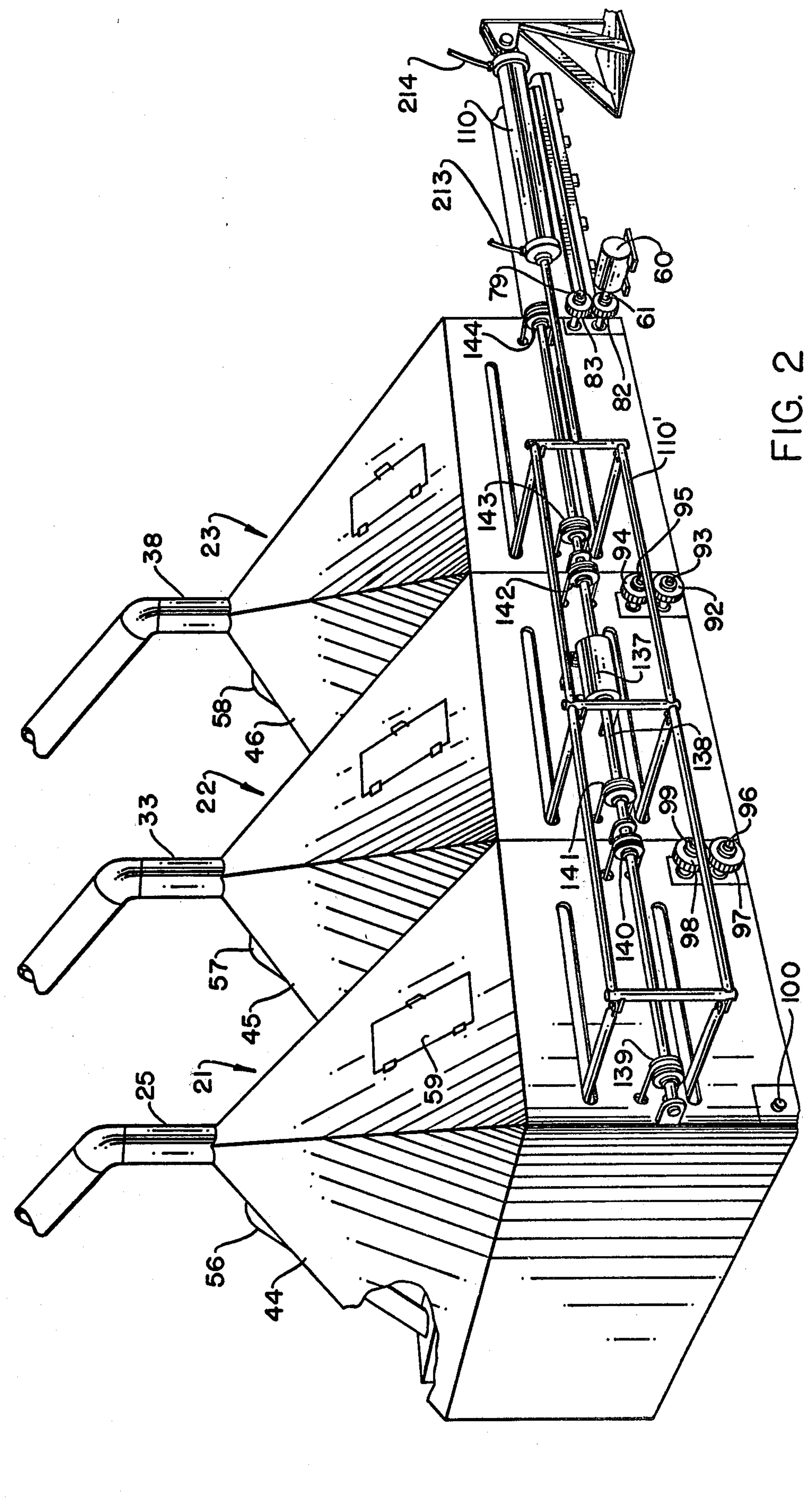
Figure 3:
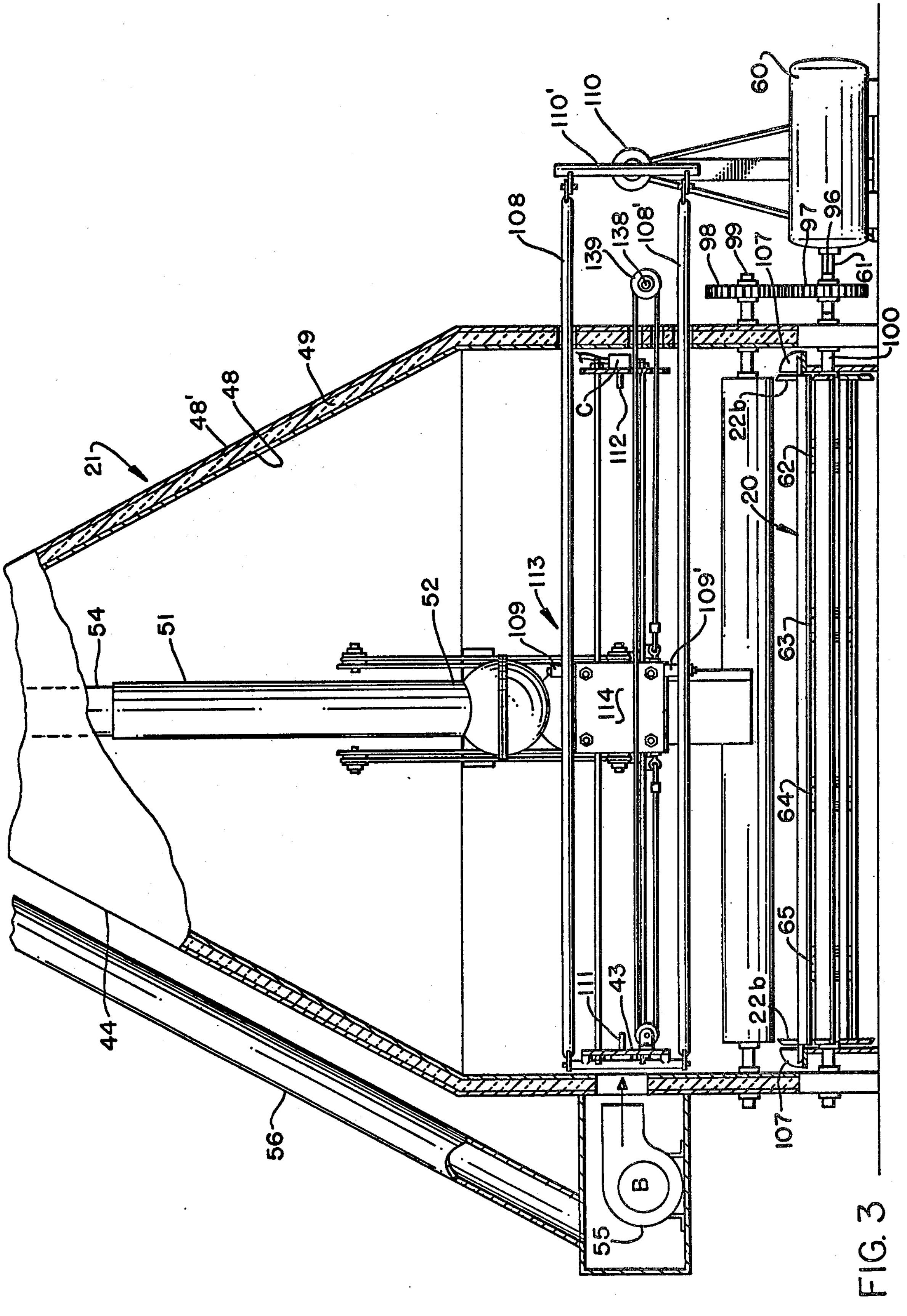
Figure 4:
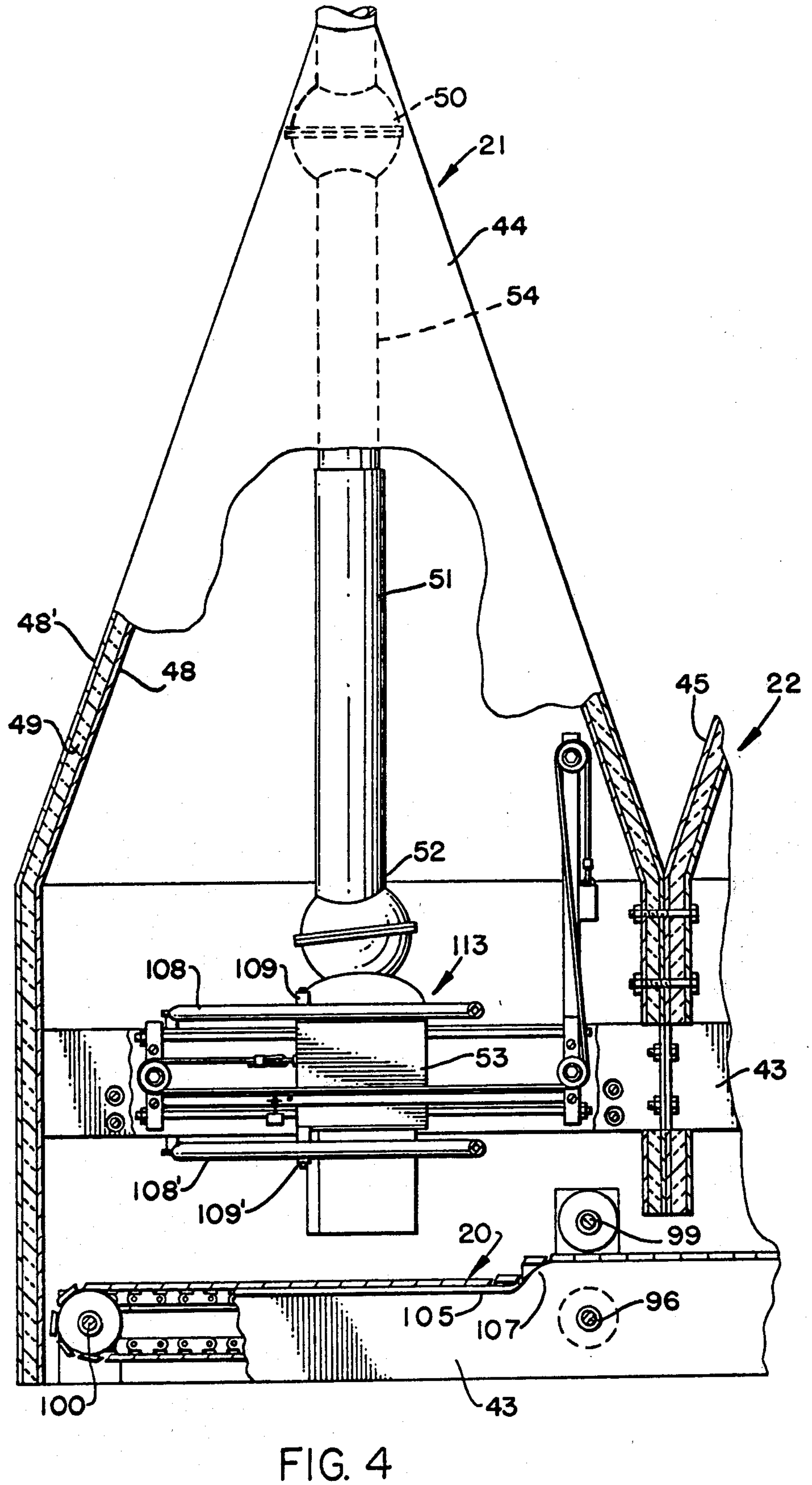
Figure 6:
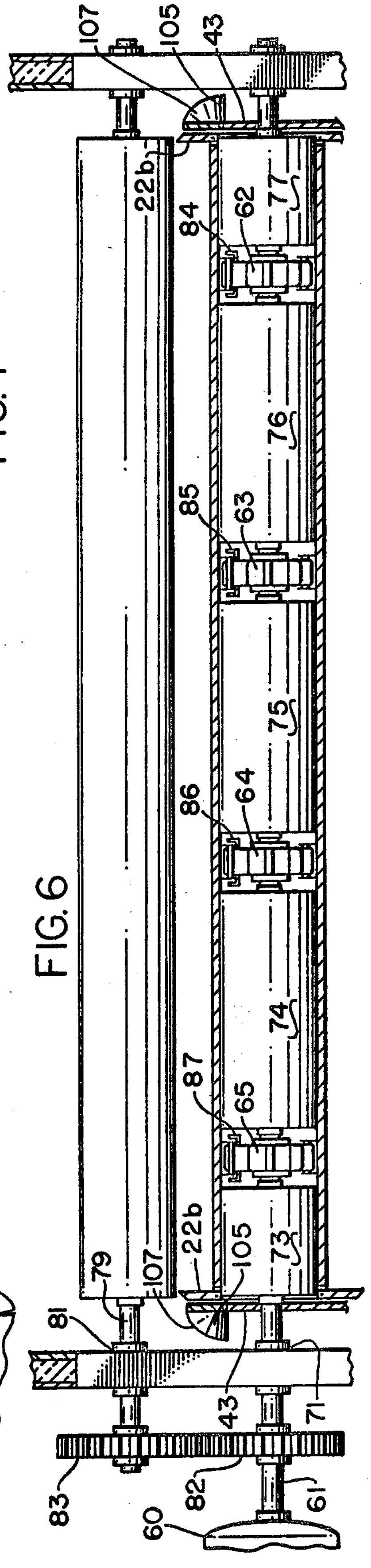
Figure 5:
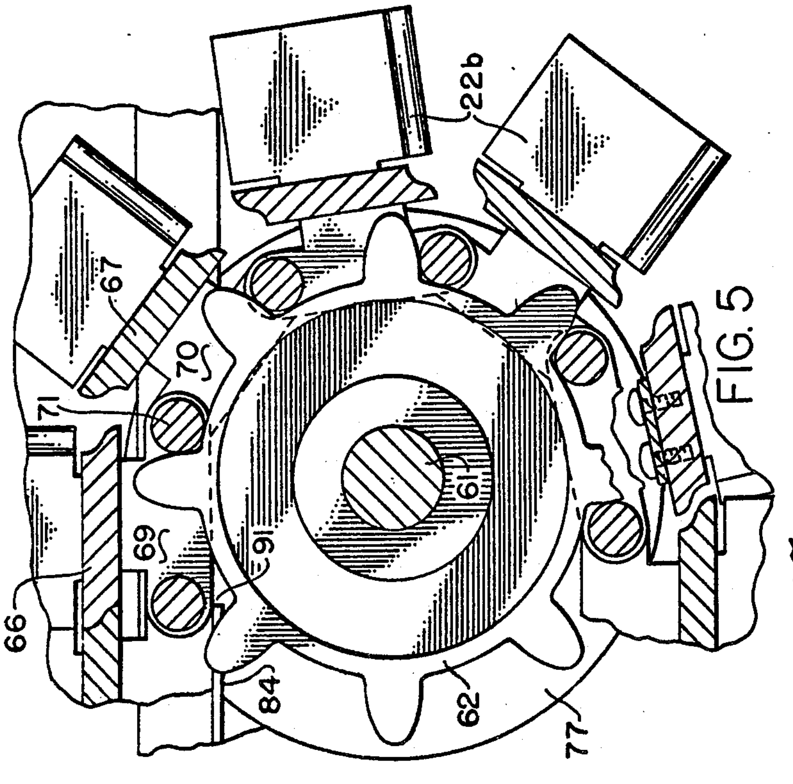

FIG. 2, a perspective view of a three-stage apparatus useful in manufacturing a wall panel product;

FIG. 3, an end elevation view of a typical stage of the apparatus of FIG. 2;

FIG. 4, a side elevation view of a typical stage of the apparatus of FIG. 2;

FIG. 5, an end view of top press and bottom rollers and their driven interrelationship as employed in each of the three stages in the apparatus of FIG. 2;

FIG. 6, a side elevation view of drive sprocket means and conveyor integrated chain drive means used in advancing the material conveyor of the apparatus of FIG. 2

Figure 7:
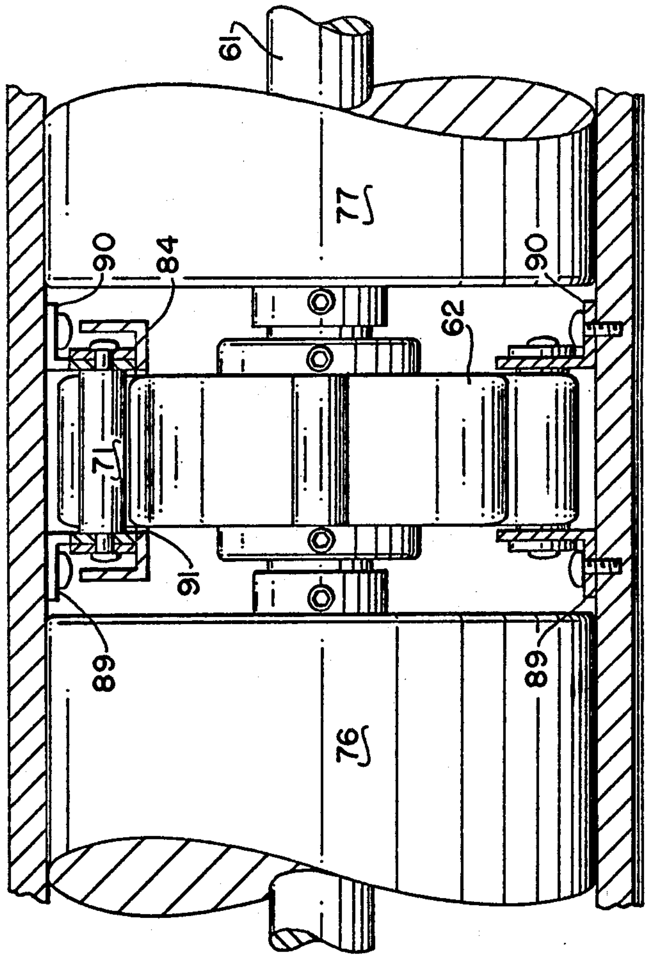
Figure 8B:
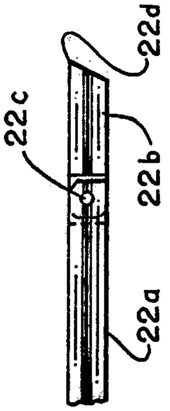
Figure 8A:
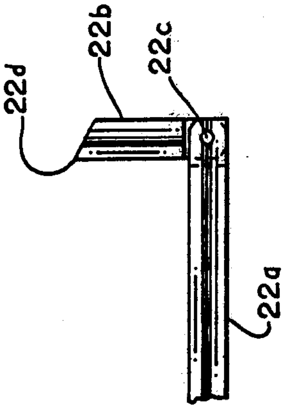
Figure 8:
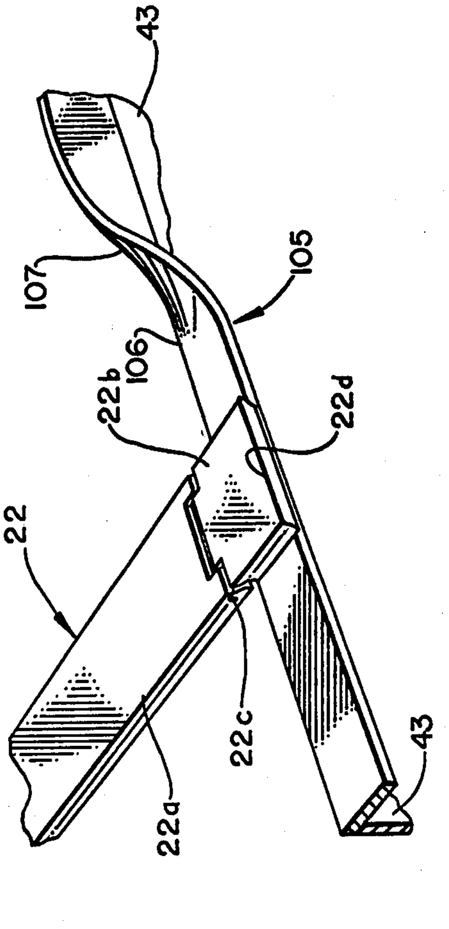
Figure 9:
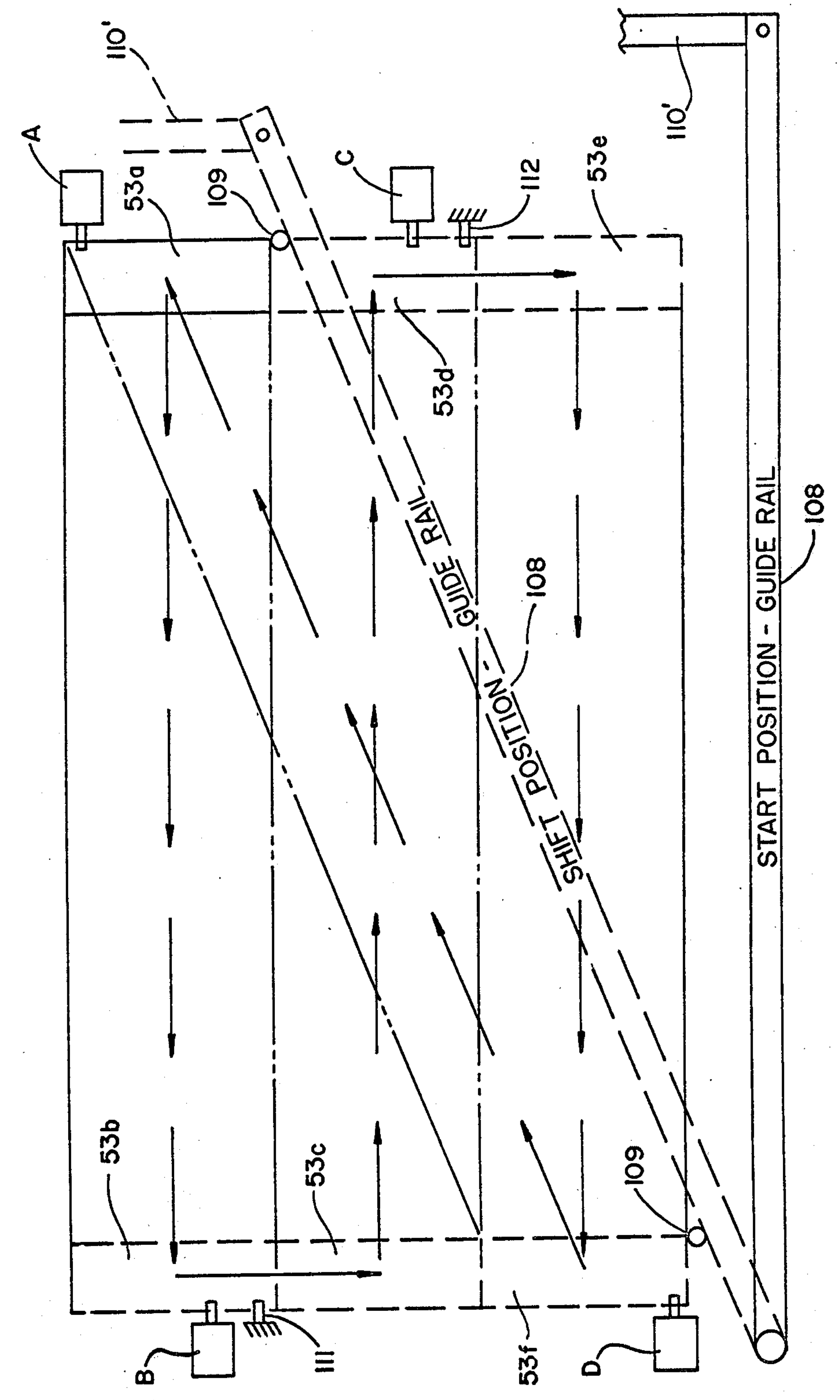
Figure 10:
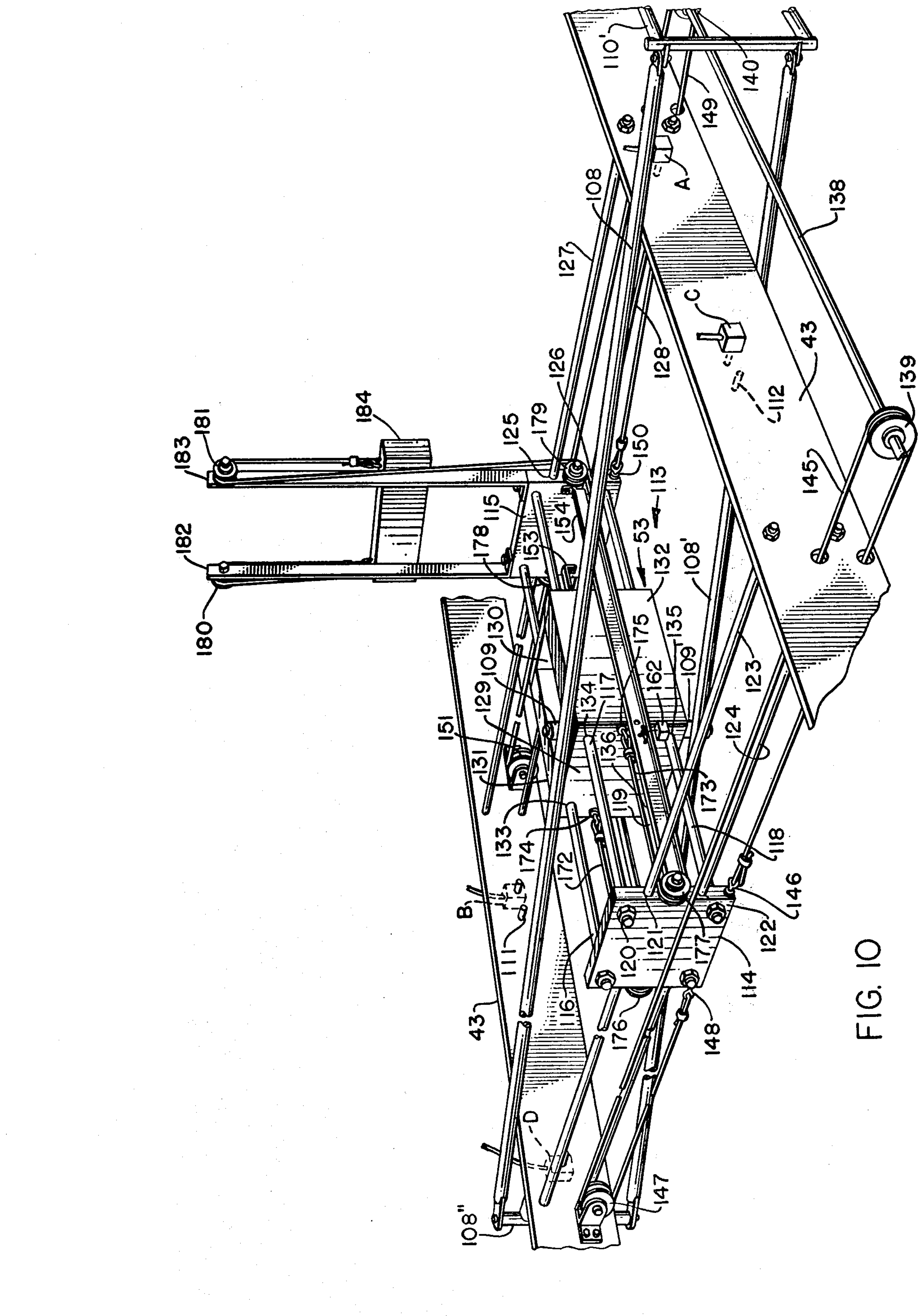
Figure 14:
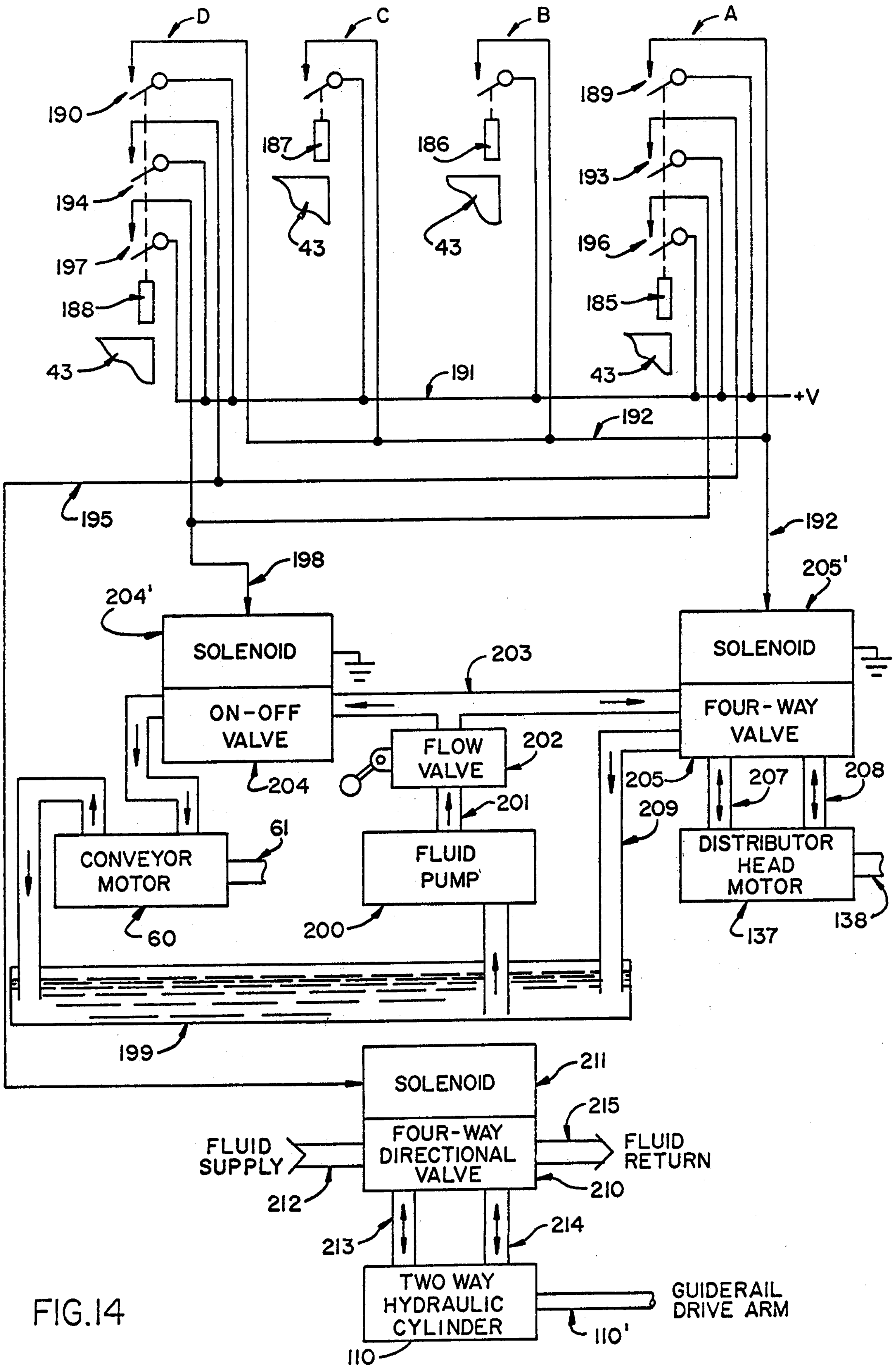

FIG. 7, an end view showing details of conveyor and drive chain guide and support means;

FIG. 8, a perspective view of a conveyor edge turn-up feature employed in the first stage of the apparatus of FIG. 2;

FIGS. 8A and 8B show the mold plate end member lying in the plane of the mold plate and the mold plate end member in an upright limited position, respectively;

FIG. 9, a diagrammatic representation of the positioning of the raw material distribution head in each of the apparatus stages, including conveyor advance and distribution head driven motor control switching means associated with the distributor in the initial stage of the three-stage apparatus of FIG. 2;

FIG. 10, a perspective view of a continuous raw material distributing mechanism, as employed in each stage of the apparatus of FIG. 2;

FIG. 11, a top diagrammatic view illustrating distributor head shift actuating means;

FIG. 12, a perspective view of a distributor head shift actuator mechanism which may be employed;

FIG. 13, a side elevation view of the distributor head shift trigger actuator mechanism of FIG. 12; and FIG. 14, a diagrammatic representation of an electric and hydraulic control system as might be employed to sequence the distributor head and conveyor drive motions to produce a continuous extrusion of wall panel building material, in accordance with the invention.

Referring to the drawings:

A system for making a wall paneling product from continuously flowing raw material sources is diagrammatically represented in FIG. 1. As will be further described in detail, a continuous conveyor 20 is caused to progress in an intermittent, motion-control manner through successive oven-like enclosures 21, 22, and 23. The three ovens, individually associated with successive contiguous lengths of conveyor 20, are associated with three distinct phases of wall panel production, designated successively as phases $\phi 1$, $\phi 2$, and $\phi 3$.

Each of the three phases comprises: (1) The even distribution of raw material on the expanse of conveyor surface contained therein, from a continuous flow of that material supplied to the phase or section; (2), the application of heat to the material distributed; and (3), the rolling and/or shaping of the material on the conveyor as it is caused to progress from that phase to the succeeding phase. The finished product is a continuous extrusion of wall panel material from the output stage (φ3).

Thus, FIG. 1 depicts a souce of shredded thermoplastic material 24 being supplied through flow means 25 to material distribution means 26, associated with the first section (φ1). A source of heat 27 is indicated as being supplied to φ1. At the terminus end of section φ1, a roller means 28 is depicted, with roller means 28 followed by a material edge-folding means 29.

The section 22, designated φ2, likewise is supplied with a continuous flow of raw material comprising a mix of shredded thermoplastic material and wood aggregate, such as shredded tree bark. Thus, a source of shredded thermoplastic material 30 and a source of shredded wood particles 31 are shown supplied to a mixing hopper 32, which is continuously delivered through flow means 33 to a material distribution means 34, associated with φ2. A source of heat 35 is supplied to the φ2 section, and at the terminus extreme of the φ2 section, a pressure rolling means 36 is depicted.

The output section 23, designated φ3, is supplied with a continuous flow of raw material 37 which (like that of input section φ1) is comprised of shredded thermoplastic material. The thermoplastic material 37 is supplied through flow means 38, to material distributor means 39, associated with φ3. A source of heat 40 is applied to the φ3 section, and a final pressure rolling means 41, at the output end of the φ3, delivers the continuous extrusion of end product wall paneling.

FIG. 1, additionally depicts, in conjunction with the three stages of production, the sandwich-like buildup of the end product as the conveyor 20 progresses through the successive phases of production. With the assumption that the process is in operation, with the output end of the conveyor having progressed successively through all three stages, φ1 through φ3, the first stage φ1 puts down an even layer of thermoplastic 24', which is fused by heat source 27, rolled by roller means 28, and subsequently delivered to section φ2. In section 22 (φ2), a mixture of thermoplastic and wood particle aggregate is spread over the output from φ1, and the thermoplastic fused thereon by heat source 35, and, subsequently, pressure rolled by rolling means 36, to form an intermediate layer 30', 31', pressure bonded to the underlying surface 24'.

In φ2, the thermoplastic material is preferably, as indicated, preheated prior to mixing with wood aggregate, to assure fusing in the oven environment of φ2; it being realized that the wood aggregate, as mixed with a shredded thermoplastic in φ2, acts as a heat insulator. Preheating of the thermoplastic 30 in φ2 compensates for the insulating effect of the wood particles and assures that the oven environment in φ2 will effect a fusing of the thermoplastic in that stage so that it properly acts as a bonding agent for the wood aggregate in that stage.

In φ3, a top layer of shredded thermoplastic material is evenly distributed over the output from φ2, fused in the oven environment of φ3, and pressure rolled and bonded to the intermediate material layer 30', 31', to form a top layer 37'. The end product emerges, after pressure rolling and shaping in output roller means 41, as a relatively smooth thermoplastic-faced panel material 42, with a core comprised of wood aggregate bonded with thermoplastic. The process, to be described in detail, produces a continuous extrusion of wall panel material of pre-selected width, which may be sawed into desired lengths for construction purposes.

As will also be further evident, the process is uniquely adapted to use of relatively simple and inexpensive apparatus, all elements of which may be easily assembled on site location, using commonly available mechanical structures and elements. The material distribution system of the present invention permits even distribution of raw materials from continuous flow sources, simultaneously, in all three stages. Because the oven environments may be fixed, and the material distribution is continuous, a unique conveyor advance is incorporated to continuously process a running length of finished product. Control means for the material distribution means and conveyor advance are associated with but one of the three stages, with the remaining two stages being controlled in driven synchronism, with the controlling one of the stages. The common control feature and relatively simple apparatus requirements, to be described, permit fast production rates from relatively inexpensive equipment, which is consistent with the extremely low-cost raw materials employed in providing an extremely economical wall panel product, having characteristics superior in many usages to those of conventional materials.

The wall paneling product and process herein described embodies a relatively simple method by means of which discarded thermoplastics may be recycled into a usable product. These thermoplastics may comprise discarded plastic bottles, toys, cartons, containers, shredded to facilitate distribution evenly on a conveyor surface. Thermoplastic materials, when heated to a temperature of, for example, 500° or less, form a molten, pliable material. In this pliable state, by use of rollers, the material can be shaped into a desired pattern, and when cooled, the material once again becomes rigid. When mixed with an aggregate and heated, and pressure applied to the material, a nonuniform mass is created. The application of thermoplastic material to both sides of the aggregate-plastic slab creates a structure comparable to conventional wood-constructed paneling. The apparatus to be described, operates to continuously extrude a running length of paneling from continuous flow sources of shredded thermoplastic material and cellulose-fiber particles (such as shredded tree bark). The apparatus, may be prefabricated from standard structural materials and hardware so that it may be assembled on site, with attendant savings in shipping and handling costs. Simple, reliable, mechanical means may be employed to effect material distribution and conveyance control through the successive machine operational phases.

Referring to FIG. 2, the assembled machine is depicted as three, substantially identical sections connected, in tandem, through which a continuous conveyer 20 is advanced in a controlled manner. Material flow means 25 provides a continuous flow of shredded thermoplastic material to the first machine section 21. Material flow means 33 provides a continuous flow of a mixture of shredded thermoplastic and shredded cellulose fiber material (such as, tree bark) to the intermediate machine section 22. Material flow source 38 provides a continuous flow of shredded thermoplastic material to the output machine section 23.

Each machine section incorporates a canopy structure which extends upwardly from side walls fixed to the machine mounting base 43. Similar canopy structures 44, 45, and 46 are depicted for the successive machine sections 21, 22, 23, and, as best depicted, in typical end and side views of FIG. 3 and FIG. 4, are comprised of a double-walled plate structure with intermediate insulation, so as to function as oven wall members for the confines defined thereby. The upper apices of the four canopy walls communicate with the respective material flow source means for that machine section. The resulting pyramidal canopy structure, as will be further evidenced, forms an oven enclosure having a geometry to permit the material delivery end of a universally pivotable and telescopically extendable material distributing type structure, carried within the confines of each canopy, to be repeatedly positioned via a distribution system, to be described, over a rectangular expanse of conveyor surface over which the oven canopy is located.

FIG. 3 and FIG. 4 depict the basic general features of machine section 21 and are typical of all three machine sections. The end view of FIG. 3 illustrates the canopy walls as being comprised of two sheets of metal, the inner one of which is treated against severe heat. Both sheets might be, for example, 3/16" thick. Inner sheet 48 might comprise #321 stainless steel, and outer sheet 48' might comprise painted steel plate. The confines between inner and outer plates 48 and 48' are filled with mineral wool block insulation 49.

FIG. 3 and FIG. 4 illustrate the canopy apex 50 of machine section 21, through which is received a telescopical and universally pivotable material delivery pipe 51. The delivery end 52 of pipe 51 pivotably communicates with a material distribution head member 53, while the upper end 54 of pipe 51 pivotably communicates with the material deliver pipe 25 (FIG. 2). The respective top and bottom pivots may be orthoganally oriented to effect a universal pivot action, and the pipe section 51 may be telescopical in nature, such that the distribution pipe 51 adapts in angular orientation and length to facilitate raw material delivery to distribution head 53, as head 53 is caused to be positioned, by means to be further described, over predetermined, rectangular, area of conveyor 20, over which oven canopy 44 extends.

With further reference to FIG. 3 and FIG. 4, a forced air heating system comprising a heater element and blower assembly 55 directs heat over the surface of conveyor 20 within the confines of oven canopy 44, and thence upwardly through a return pipe 56 which extends from canopy 44 near canopy apex 50, to the heater assembly 55. The succeeding machine sections 22 and 23 (FIG. 2) comprise similar heating assemblies. Heater return pipes 57 and 58 are depicted for respective intermediate and output machine sections 22 and 23.

As shown in FIG. 4, the side wall of the canopy 44 of machine section 21, as with all three machine sections, may be fitted with an access door 59 for purposes of entrance for cleaning and repair.

The conveyor 20, as depicted in FIGS. 2, 3, and 4, is part of an integrated conveyor drive chain and mold plate assembly with which the roller means of each machine section is integrally related so as to be driven in synchronism with the conveyor during conveyor advances through the successive machine sections. FIG. 2 depicts a conveyor drive motor 60 mounted to the machine base 43. Motor 60 drives shaft 61 upon which are fixed a plurality of drive sprockets 62, 63, 64, and 65. As will be further described, the conveyor comprises plate members extending transversely across, which are fixed to successive contiguous ones of drive chain roller links which engage the drive sprockets 62–65. In the exampled arrangement, each conveyor transverse plate member is fixed to four roller drive chain links, successive ones of which are drivably engageble with the drive sprockets 62–65 on the conveyor motor drive shaft.

Drive sprocket engagement with conveyor plate integrated drive chain roller links is illustrated in FIG. 5. An adjacent pair of conveyor plate members 66 and 67 are shown in side view in FIG. 5, along with associate links of the integrated chain and roller system. Driving sprocket 62, as mounted on conveyor drive shaft 61, is illustrated as being sized to the character of the roller chain 68 (typical of four drive chains employed) with which it communicates in driving arrangement. Successive conveyor plate members, such as members 66 and 67, are affixed to successive links 69 and 70 with typical pivot pin member 71 connecting the links 69 and 70.

FIG. 6 illustrates a side view of the integrated conveyor drive and synchronously driven roller assembly as employed in the output section 23 of the apparatus. Drive shaft 61 is rotatably mounted at each end in machine frame 43 by means of end bearings 72 and 72'. Drive shaft 61 carries respective drive sprockets 62–65. A lower roller member, comprised of hollow cylinders 73, 74, 75, 76, and 77, are mounted for rotation by drive shaft 61. Roller members 73–77, collectively, provide a lower support for molding plates of conveyor 20 under an upper compression roller 78. Upper compression roller 78 is mounted on a driven shaft 79 which is rotatably mounted in machine frame 43 by means of respective end bearing members 80 and 81. Upper compression roller is driven in synchronism with the lower support roller member by means of a driving gear 82 on the lower roller shaft 61 in mesh with a driven gear 83 on the upper roller shaft 79.

As depicted in FIG. 6, and detailed in FIG. 7, the conveyor 20 passes between the upper and lower roller members, with links of the conveyor plate integrated drive chain in driving engagement with an associated one of drive sprockets 62–65 on drive shaft 61 which is driven by conveyor drive motor 60. The sectioned lower roller member, with drive sprockets carried between adjacent sections, permits the inclusion of a drive chain guide channel member for each of the four driven chains employed. The channels may be comprised, for example, of four-inch channel iron members, machine frame mounted, which extend the length of the machine. These guide channels are dimensioned to slidably and conformingly receive the rollers and lengths of the conveyor plate integrated drive chain, and as depicted in FIG. 6, one channel member 84 is affixed to the machine frame to receive the drive chain driven by sprocket 62. Channel guide member 85, 86, and 87, likewise, receive respective ones of drive chains driven by sprockets 63–65, it being understood that each of the channel members 84–87 would be formed with an appropriate bottom plate cut-out to facilitate driving engagement between the chain supported thereby and the associated one of the drive sprockets 62–65.

FIG. 7 shows a typical detail of the relationship between conveyor mold plate affixed chain link, drive chain channel support, and lower roller-drive sprocket member. FIG. 7 depicts bottom roller members 76 and 77 of FIG. 6, upon which conveyor 20 rides, with frame mounted chain guide support channel member 84 providing a support for the roller member 88 of the drive chain and its associated conveyor plate mounting brackets 89 and 90. The drive sprocket 62 is shown partially cut away, it being understood that the channel support member 84 would be provided with a bottom cut-out 91 to permit driving engagement between the drive sprocket 62 and the depicted chain roller member 88. The four drive chains employed would be similarly driven through cut-outs in respective channel guides. In this manner, the conveyor mold plate surface is provided with longitudinal support throughout the length of the machine.

With reference to FIG. 2, the roller assemblies at the output ends of machine sections 21 and 22 comprise assemblies like that depicted in FIGS. 5, 6, and 7, for the output roller-drive assembly. Depicted in FIG. 2 are drive gear 92 on a sprocket and lower roller carrying shaft 93 for synchronous drive of the rollers in the output end of the intermediate machine section 22. Drive gear 92, is driven by the driving engagement of the four driven chains with sprockets on shaft 93, and through driving engagement with upper roller driven gear 94 on shaft 95, provides synchronous drive of the top and bottom rollers at the output end of the intermediate machine section with the conveyor drive.

A similar synchronous driving arrangement is employed for the roller assembly at the output end of the input machine section 21, including bottom roller drive shaft 96 (chain-sprocket engagement driven), with associated drive gear 97 in driving engagement with driven gear 98 on upper roller shaft 99.

The continuous conveyor 20 is carried around an idler shaft 100 (left extreme of FIG. 2) upon which idler sprockets 101 through 104 are affixed for guiding interface with each of the four conveyor mold plate integrated drive chains.

It is then evident that rotation of drive shaft 61 by energization of conveyor drive motor 60, causes the conveyor 20 to advance through the machine sections, with simultaneous synchronous drive of the pressure rollers at the respective output ends of each of the three machine sections.

As previously discussed, with reference to FIG. 1, the input machine section 21 includes an edge turn-up means 29 to provide a smooth nailing and gluing edge surface for the finished paneling product. Subsequent to the distribution, fusion and rolling of thermoplastic material in the $\phi$1 machine section, and prior to material distribution in the $\phi$2 machine section, the rolled thermoplastic base is turned up on each edge. Conveyor plate structure and machine base mounted guide means for effecting material edge foldup is illustrated in FIG. 8.

Referring to FIG. 8, each of the mold plates 22_a_ and 22 _b_ of the conveyor 20 is provided with a hinged end extreme section 22_d_. FIG. 8 illustrates the section 22_d_ for one end of plate 22_a_ and an associated frame mounted turn-up guide 105, typical of a similar end plate and turn-up guide which would be incorporated at the other end of the conveyor plate. Plate 22_b_ may be pivotable upwardly about an axis, defined by pin means 22_c_ with which it is affixed to plate 22_a_, and as shown in the respective "up" and "down" positions in FIGS. 8A and 8B, may be appropriately formed with an accurate edge at the pivot end thereof to conform with an arcuate end surface in plate 22_a_, so as to be pivotable between a first mechanically-stopped, in-line position and a second, mechanically-stopped, up-right position with respect to the surface of conveyor plate 22_a_.

Turn-up guide member 105, as shown in FIG. 8, may compress a pipe or bar member affixed to the machine from 43, and extending longitudinally through all three machine sections. In the input machine section 21 ($\phi$1) the guide member permits the conveyor plate end member 20_b_ to ride in sliding engagement with the horizontally oriented surface 106 of guide member 105, and with the mold plate end member 22_b_ lying in the plane of the mold plate 22_a_. Subsequent to rolling in $\phi$1, and prior to material distribution in $\phi$2, the end members of the successive conveyor mold plates 22_a_ are, upon conveyor advance, cammed upwardly, by engagement with transition section 107 of guide member 105, to the upright limit position depicted in FIG. 8A, with the rolled thermoplastic material layer being turned up on each edge. In addition, the edge extremes of the conveyor plate turned up members may be fashioned with a cutting edge, as depicted in FIG. 8, such that upon subsequent pressure rolling in the succeeding machine sections, a cut-off edge 22_d_ acting against the upper pressure roller members provides an upper edge trim of the finished product. The conveyor plates emerged from the final rolling in the output section, and are inverted upon subsequent conveyor advance. Upon being driven again into entrance position to the input machine section, the mass distribution of the end plates may be designed to cause the plates to fall into horizontal position, by gravity action. Alternatively, a further guide means might be incorporated in the input end of the $\phi$1 machine section to effect an appropriate camming action to assure that the edge plates are horizontally oriented prior to material distribution in the input machine section 21.

As previously described briefly, with reference to FIG. 1, each of the machine sections incorporates a material distributor which functions to spread an even distribution of raw material for a continuous flow source over a section of conveyor 20. Because of a need for a continuous flow of materials, the distributor in each machine section must be continuously moving, and this continuous movement must be integrally coordinated with conveyor advance through the machine to provide even material distribution and a continuous extruded length of wall paneling from the output stage of the machine.

Reference is again made to FIGS. 3 and 4, which depict a material distributor head 53 as employed in the input section 21, wherein a universally pivotable and telescopical extendible material flow pipe 51 is shown affixed to distributor head 53. Means will now be described by which the distributor head 53 (and, similarly, distributor heads associated with like distribution means in succeeding machine sections 22 and 23) is caused, in predetermined drive synchronism with conveyor 20, to effect a uniform distribution of raw material from an associated continuous-flow material supply, upon the conveyor.

The general distribution principle is illustrated in FIG. 9. A "start" or home position 53_a_ for distributor head 53 is depicted in the upper right corner of a section of conveyor 20 upon which material is to be evenly distributed. As depicted in FIG. 9, the conveyor beneath the head 53, when caused to advance, moves in the upward direction as shown. Material distribution is exampled in FIG. 9 for even distribution over a four-foot-long conveyor section, the conveyor being depicted as approximately eight feet in width. Thus the dimension of the opening in distributor head 53, in the longitudinal direction along the conveyor, is one foot.

Assuming the conveyor section beneath head 53 is stationary, the distribution is effected (by positioning means to be described) by first driving head 53, transversely, across the conveyor on a first run, to spread a one-foot-wide strip of material. Upon head 53 reaching the opposite transverse extreme position 53*b*, the head is shifted rearwardly, one foot, to position 53*c*, and driven in the reverse direction (2nd run) to spread a second layer of material adjacent that spread on the first run. Upon reaching position 53*d* at the completion of the 2nd run, head 53 is shifted rearwardly, by another foot, to position 53*e* whereupon it is again reversed and driven on a thrid run, to distribute a third, foot-wide, layer of material adjacent that spread in the second run. Upon completing the thrid run, and arriving in position 53*f*, a multiple action is initiated: (1), the conveyor is started on a four-foot advance; (2), the distributor drive is again reversed to impart a transverse drive of head 53 back to the right side; and (3), a guide rail 108 is positioned from the depicted "start" position, to the depicted "shift" position. Guide rail 108 then acts as a positioning cam surface against which a roller-type cam follower means 109, affixed to head 53, rides, and the head 53, in being driven to the right, is caused to follow a diagonal path back to the head "start" or home position 53*a*, reaching "home" position at the conclusion of the four-foot conveyor advance. With this geometry, the head is positioned transversely across the conveyor to spread a fourth, foot-wide, strip of material adjacent that spread in the third run, with the head 53 arriving back in home position for a repeat of the above-described cycle. They conveyor is stopped at the end of the fourth run, followed by subsequent spreads of runs 1, 2, and 3, with the conveyor stationary. The distribution conveyor advance cycle is repeated, continuously, such that the distributor head 53 is continuously positioned to evenly spread the continuous flow of material supplied thereto. Conveyor advance is intermittent, however, the conveyor being stationary for distributor head runs 1, 2, and 3, and being advanced four feet at a predetermined rate, related to the distributor head transverse drive speed, to effect the fourth transverse material spread on the conveyor surface.

To reiterate, the synchronized material distribution and conveyor advance is summarized as follows:

| Conveyor Motion: | Distributor Head Motion: |
|---|---|
| Stationary | 1st run |
| | 1st shift |
| | 2nd run |
| | 2nd shift |
| | 3rd run |
| 4-foot advance | 4th run |
| | (New Adjacent Section) |
| Stationary | 1st run |
| | 1st shift |
| | 2nd run |
| | 2nd shift |
| | 3rd run |
| 4-foot advance | 4th run |

and so on.

As will be further described, a reversing control for a distributor head transverse drive motor is incorporated to reverse the drive of the head each time it reaches a transverse extreme of the distribution pattern. A mechanical shift mechanism effects distributor head rearward one-foot shifts at the completion of the first and second runs, by engagement of frame-mounted, trigger release pins engaging triggered distributor head longitudinal shifting means, as the head is driven to the end of the first and second runs. Control means for positioning the guide rail between "start" and "shift" positions, along with means to start and stop the conveyor advance motor, are effected by frame-mounted switches operated by distributor head impact as the head reaches that start position depicted in FIG. 9, and as the head completes the third run.

As functionally depicted in FIG. 9, a first switch A, activated by head impact, when head 53 reaches the start position 53*a* upon completion of the 4th run, may effect conveyor drive motor turn-off, distributor transverse drive motor reverse, and retraction of the guide rail 108, from shift position to start position, by control of a two-position hydraulic cylinder 110 which pivots rail 108 between "shift" and "start" positions. A 2nd switch B may be head-impact activated at completion of the 1st run to effect distributor head drive motor reverse, while a machine frame mounted trigger release pin 111 impacts with a distributor head shift mechanism to effect the 1st head shift. A 3rd switch C may be head-impact activated at completion of the 2nd run to effect distributor head drive motor reversal, while a frame mounted trigger release pin 112 impacts with the distributor head shift mechanism to effect the 2nd head shift. A 4th switch D may be head impact activated upon completion of the 3rd run, to turn the conveyor drive motor on, to effect distributor head drive motor reversal and to activate the guide rail hydraulic cylinder 110 to position guide rail 108 to the "Shift" position, thereby, to collectively effect the 4th distributor head run as the conveyor advances. Details of a control system responsive to switches A through D, to effect distributor head transverse drive, conveyor motor on-off control, and guide rial pivot control, will be further described.

FIG. 10 illustrates a material distribution mechanism, as may be employed in each of the three machine systems. The mechanism depicted in FIG. 10 include the above-mentioned motor drive and guide rail pivot control switches as they would be incorporated in the distributor of the input section 21 of the machine (φ1); it being realized that, due to the afore-described edge turn-up feature incorporated in the input section, the distribution of material on the conveyor 20, in the input machine section 21, is over a wider expanse than that in succeeding sections 22 and 23. By employing a single head drive motor and drive shaft, common to all three distributor heads, the distributor head motor reverse, and other drive control, may be controlled by switches in input section 21, only— with provision made to drive the distributor heads transversely in the following sections, at a proportionately lesser speed to compensate for the lesser width of material to be spread in these sections.

With reference to FIG. 10, a distributor head mechanism, primarily mechanical in nature, positions the distributor head 53 in machine input section 21, in response to a cable drive imparted from an externally mounted distributor head drive shaft, rotation of which effects distributor head transverse positioning as concerns the underlying conveyor surface upon which material delivered to head 53 is evenly distributed. A simple lever and weight system, relatively immune to the high temperature over environment within which the distributor is located, is utilized to power the distributor head shifts longitudinally back along the conveyor.

Referring to FIG. 10, distributor head 53 is mounted for longitudinal positioning (along the underlying conveyor) and transverse positioning (across the underlying conveyor) by being longitudinally positionable on a carriage 113 which, itself, is transversely positionable. Carriage 113 comprises end plate members 114 and 115 to which are affixed, and between which extend, four steel rod guide rails 116–119. Guide rails 116–119 may be received in reduced diameter bores in the end plates, and threadedly affixed to each end plate by bolts 120. Each carriage end plate 114 and 115 is formed with a pair of transversely extending bore openings through which machine, frame-mounted, transversely-extending carriage guide rods are extended. Carriage end plate 114 is formed with bore openings 121 and 122, which may include appropriate bushing inserts such that end plate 114 is slidably mounted on transversely extending carriage guide rods 123 and 124. Guide rods 123 and 124 are affixed to, and extend between, respective opposite machine frame members 43. Carriage end plate 115 is similarly formed with bore openings 125 and 126, which may also include appropriate bushing inserts such that end plate 115 is slidably mounted on transversely extending guide rods 127 and 128, guide rods 127 and 128 being affixed to, and extending between respective opposite machine frame members 43.

Distributor head 53 is comprised of front and rear end plates 129 and 130, and side plates 131 and 132, so as to define material delivery opening that extends approximately one-third of the longitudinal dimension of the distributor carriage 113—the dimension of the above-defined distributor head shifts. Distributor head side plates 131 and 132 are provided with bore openings through which the head guide rods 116–119 extend. FIG. 10 shows bore openings 113–136 through which respective head guide rods 116–119 extend. Bore openings 133–136 may include appropriate bushing inserts such that the distributor head 53 is slidably mounted on longitudinally extending guide rods 116–119.

The distributor head 53 is driven across the underlying conveyor by drum and cable means which cause the head carriage to travel back and forth across the underlying conveyor. For this purpose, a distributor head drive motor 137, fixed-mounted, with respect to machine frame 43 and located externally of the machine oven canopies 44, 45, and 46 (FIG. 2), may be employed. As depicted in FIG. 2, distributor head drive motor 137 may drive a distributor head drive shaft 138, upon which cable drive drums are positioned to drive the distributor heads in all three machine sections. A first pair of drive drums 139–140 impart distributor head transverse drive to the distributor means in input machine section 21, while further pairs of drive drums 141–142 and 143–144 impart distributor head transverse drive to the distribution systems of respective intermediate and output machine sections 22 and 23.

Referring again to FIG. 10, drive drum 139 may have a cable 145, with at least one turn wound on drum 139. The lower extent of cable 145 is affixed to distributor head carriage end plate 114 at anchor point 146. The upper extent of cable 145 is extended over an idler pulley 147 and affixed to the opposite side of end plate 114 at anchor point 148. The opposite distributor head carriage end plate 115 is likewise imparted with drive from cable 149, driven by drum 140; cable 149 having its lower extent anchored to plate 115 at point 150, and its upper extent carried over idler pulley 151 and anchored to plate 115 at point 152. With drive drums 139 and 140 of like diameter, rotation of distributor head drive shaft 138 via motor 137 causes the distributor carriage 113 to be positioned transversely with respect to underlying conveyor.

The switch-activating plungers of the aforedescribed control switches A, B, C, and D, are depicted in FIG. 10 as extending through the frame 43 into the oven environment in which the distributor head is positioned, such that the switches are distributor head impact operated when head 53 travels to successive transverse extremes during the distributor cycle.

FIG. 10 depicts previously referenced frame mounted trigger activating stop bolts 111 and 112 which, by means to be further described, trigger distributor head longitudinal shifts at the completion of the respective afore-described distributor head first and second transverse runs.

Distributor head longitudinal motion, as concerns the underlying conveyor, was previously described as a one-foot shift at the end of the first transverse run, a one-foot shift at the end of the second transverse run, and a diagonal path back to start position commencing at the end of the third transverse run and continuing during the four-foot conveyor advance to effect the fourth transverse run.

FIG. 10 illustrates guide rail 108–108' in cooperation with respective top and bottom guide rollers 109–109' on distributor head 53 in the "shift" position, with head 53 being driven towards the viewer such that head mounted guide rollers 109–109' cam against respective upper and lower guide rail members 108–108' to drive the head back to "start" position. Rail assembly 108–108' is pivoted on frame mounted shaft 108" by operation of double acting hydraulic cylinder 110 (FIGS. 2 and 9) to the "shift" position, when head 53 impacts with control switch D (FIG. 10) at the end of the third transverse run. As shown in FIG. 2, the guide rails of all three machine sections are operated in synchronism by means of a common positioning arm 110' linked to each guide rail. The "shift" position of the guide rails is effected by the distributor head impact with switch D, in the first machine section, and the "Start" position of the guide rails is effected by distributor head impact with switch A, in the first machine section.

The longitudinal shift motions of the distributor head 53 of FIG. 10 (typical of those in all machine sections) is accomplished by a weight and cable loaded trigger mechanism which is carried by the distributor carriage. Referring to FIG. 10, a carriage mounted weight and pulley system acts to urge the distributor head 53 to the viewers' right extreme position on the guide rails 116–119. Carriage mounted releasable trigger stops define stop positions for head 53. The system is "cocked" during head travel back to "start" position during conveyor advance and head 53 is held in this position by a first trigger stop. When head 53 completes the first transverse run, the first trigger stop mechanism carried by the distributor head carriage 113 is released by a frame-mounted trigger release pin to cause the head 53 to shift longitudinally by one-third its longitudinal dimension, where it engages a second trigger stop. When the head 53 completes the second transverse run, the second trigger stop is released by impact with a further frame-mounted release pin, allowing the head to shift longitudinally to a stop position, defined by head engagement with carriage end plate 114. As head 53 is next caused to be diagonally driven back along the carriage guide rails, the weight is elevated to once again provided potential energy to effect a repeat cycle of longitudinal shifts of distributor head 53.

Mechanism to accomplish the above distributor head shift operations is illustrated in FIGS. 10, 11, 12, and 13. Referring to FIG. 10, steel channels 153 and 154 are affixed to, and extend between, the carriage end plates 114 and 115. Channel member 153, as best shown in FIG. 11 and FIG. 12, carries a first trigger stop member 155, pivotable about a pin means 156 which extends through the respective upper and lower channel plates 157 and 157'. Trigger stop member 155, as best depicted in the end view of FIG. 13, is urged into the position shown in FIGS. 11-13 by means of a cable 158 affixed to member 155 at point 159 and extending through an opening 160 in the channel member, over idler pulley 161, to a weight 162. The weight 162 loads trigger stop member 155 into the depicted position, with stop edge 163 protruding transversely of channel member 153. Stop edge 163 provides a positive stop for distributor head 53, as concerns head movement from the extreme right position in FIG. 11, by abutting against end plate 114 of head 53 in the manner of a door latch. As will be further described, head 53, by means of a weight and pulley system, is constantly force-loaded for movement to the left in FIG. 11. Head 53, once driven to the right hand extreme on the carriage, is precluded from moving back by the head engagement with stop 163 of trigger stop member 155. Now, as the carriage is advanced the upper extreme position depicted in FIG. 11, machine frame-mounted trigger pin 111 passes through an access hole 164 in channel 153 and impacts with the arm 155' of trigger stop member 155 to pivot the member 155 and thereby withdrawn trigger stop edge 163 from its engagement with distributor head 53. Head 53, through imposed forced loading, then shifts to the left, and the opposite side of the distributor head end plate impacts with a further trigger stop member 165, pivotably mounted in the opposite channel member 154. Trigger stop member 165 is similar in all respects to trigger stop member 155, including (as seen in FIG. 10) a cable 166 affixed to stop member 165, and carried through channel 154 over idler pulley 167 and affixed to a weight 168 so as to urge stop member 165 into the position shown in FIG. 11, with stop edge 169 thereof protruding from channel 154 into engageable position with distributor head 53. Stop member 165 is triggered by impact with frame-mounted trigger pin 112 when the carriage is driven to that edge extreme to complete the previously described second transverse run of head 53, allowing head 53 to shift, again, to the left to a stop position defined by head end plate abuttment with the carriage end plate 114.

When head 53 is forced to travel back to "start" position during the fourth distributor head run by the above described guide rail camming action, the distributor successively engages and cams over trigger stop members 165 and 155 by pivot action of the stop members imparted from head engagement with respective inclined camming surfaces 170 and 171.

Distributor head 53 is continually loaded by a force which urges the head to the left extreme position on the carriage. A further weight and cable system carried by the distributor carriage provides this mechanical loading. As shown in FIG. 10, a pair of cable 172 and 173 are anchored at respective points 174 and 175 on the left end plate of distributor head 53, carried over respective idler pulleys 176 and 177 mounted to the respective edges of carriage end plate 114, carried back along the longitudinal expanse of carriage 113, over respective idler pulleys 178 and 179 mounted to the respective edges of carriage end plate 115, over respective idler pulleys 180 and 181, affixed to vertically-extending arm members 182 and 183, and affixed to a weight member 184. Bu this means the distributor head is seen to be loaded with a force which urges the head to the left. When head 53 is driven to the right, during the guide rail imparted camming action during the previously described distributor head fourth run, the weight 184 is raised by power supplied by the distributor drive motor, thus restoring potential energy expended in shifting the head 53 to the left, during previous transverse runs of that distribution cycle.

The control of the conveyor drive motor and distributor drive motor has been described in terms of frame-mounted control switches impacting with the distributor head as it reaches transverse extreme positions in the distribution cycle. Four such control switches were described. A first control switch A was described as being impact-operated when head 53 is driven to "start" position at the completion of the fourth run, to effect multiple actions of conveyor motor turn-off, distributor drive motor reverse, and guide rail retraction. Switches B and C were described as being distributor head impact operated, to effect distributor head drive motor reversals at the completion of the first and second distributor head transverse runs. Switch D was described as being distributor head impact operated, upon completion of the third head transverse run, to effect multiple actions of conveyor motor turn-on, distributor head drive motor reverse, and guide rail pivot.

FIG. 14 depicts a hydraulic drive system under control of switches A, B, C, and D which might be employed to synchronously drive the distributor heads and interrelated conveyor advances. The hydraulic drive system depicted in FIG. 14 is by way of preference, and not by way of limitation, as concerns the apparatus.

Referring to FIG. 14, the control switches operated by distributor head impact in the input section 21 of the apparatus are shown as being momentary, plunger-operated switches. Switch A, comprising three sets of contacts, is closed by impact of switch-activating plunger 185 with distributor head 53. Switches B and C, each comprising a single set of contacts, are closed by impact of respective switch-activating plungers 186 with distributor head 53. Switch D, comprising three sets of contacts, is closed by impact of switch-activating plunger 188 with distributor head 53.

Contact set 189 of switch A, the single contacts of switches B and C, and contact set 190 of switch D are utilized in distributor head reverse control. Distributor head impact operation of any of these switches reverses the distributor drive motor from the rotational direction existing at the time of impact. As shown in FIG. 14, first contacts (lower depicted ones) of each of these head drive motor reversing contact pairs are connected to low voltage D. C. source 191 to provide an impulse of D.C. voltage on a common control line 192, to which the respective second contacts (upper depicted ones) of each of the contact pairs are parallel connected. The hydraulic distribution head drive system, to be described, responds to each such voltage impulse to reverse the direction of distributor head drive motor 137.

Respective second sets of contacts 193 and 194, of switches A and D, have lower depicted contacts connected to voltage source 191, with upper depicted contacts parallel-connected to a common line 195. Closing of either of these contact pairs provides an impulse of D. C. voltage on common line 195, in response to which a double-acting hydraulic cylinder may be activated between alternate first and second piston positions to drive the distributor guide rails between the afore-described "start" and "shift" positions thereof.

Respective third sets of contacts 196 and 197, of switches A and D, have lower depicted contacts connected to D. C. voltage source 191, with upper depicted contacts parallel-connected to a common line 198. Closing of either of these contact pairs provides an impulse of D. C. voltage on common line 198, in response to which a hydraulic "on-off" valve may turn a hydraulic conveyor motor 60, "on" and "off".

As depicted in FIG. 14, each of the conveyor and distributor head hydraulic motors 60 and 137 may be associated with a common hydraulic supply system including a fluid reservoir 199 and pump 200 delivering fluid in supply line 201 through an adjustable flow valve 202, to a common manifold supply 203.

The conveyor drive motor is powered by fluid flow from manifold 203, through a hydraulic on/off valve (two-way) 204. The valve 204 is controlled, position-wise, by an associated solenoid 204', which, in response to successive D. C. voltage impulses on control line 198, may operate a toggle mechanism to position the valve 204 between alternate successive open and closed positions, to thereby respectively energize/de-energize conveyor drive motor 60.

The distributor head drive motor 137 is continuously running in one direction or the other by controlled reversal of fluid flow therethrough via a four-way hydraulic directional valve 205. In response to successive D. C. impulses on control line 192, a solenoid 205', associated with valve 205, operates the valve between positions, which reverses the flow of fluid from manifold supply 203 through motor 137. A first position connects manifold supply 203, through line 207, to line 208, and from line 208 to the return line 209. A second valve position connects manifold supply 203 through line 208, and from line 207 to the return line 209.

As hereinbefore described, a fixed relationship between the rate of distributor head transverse drive and conveyor advances rates is dictated by the design geometry of the distribution system. The common controllable supply for the conveyor drive and distributor head drive motors, as shown in FIG. 14, permits the drive rates imparted by each of these motors to be proportionately adjusted via flow valve 202 to thereby permit adjustment in production rate without upsetting the design imposed relationship between conveyor advance and distributor head transverse drive rates.

The material distribution system guide rates were described as being operated in unison between the described "start" and "shift" positions thereof by means of common drive linkage arm 110' being translated between first and second positions via a two-way hydraulic cylinder 110. FIG. 14 shows hydraulic cylinder 110 as being operable to drive arm 110' between first and second positions, in response to successive D. C. voltage impulses on contol line 195. A four-way directional hydraulic valve 210 is employed to reverse the fluid flow through cylinder 110. Solenoid 211, associated with valve 210, in response to successive D. C. voltage impulses on control line 195, operates the valve between positions which reverse the fluid flow. A first position directs fluid from supply line 212 through line 213, and from line 214 to return line 215. A second position of valve 210 directs fluid from supply line 212 through line 214, and from line 213 to return line 215.

The control system of FIG. 14 is thus seen to effect the integrated drive control for the apparatus. The desired control sequence of material distribution runs and conveyor advances is realized by distributor head impact operated control switches which are located in the input section 21 of the apparatus, since this section necessitates the longest distribution head transverse runs, thereby permitting distributor head drive motions to be simultaneously effected in subsequent machine sections having shorter transverse distribution run requirements by employing lesser diametered cable drive drums for the distributor carriages in those sections. The employment of a common fluid flow adjustable hydraulic supply for the conveyor drive motor and distributor head drive motor permits the production rate of the apparatus to be adjusted, while keeping intact the necessary drive rate relationship between distributor heads and conveyor, as imposed by the geometry of the distribution system.

Whereas this invention is herein illustrated and described with respect to a particular embodiment thereof, it should be realized that various changes may be made without departing from essential contributions to the art made by the teachings hereof.

I Claim:

1. A material distribution apparatus for spreading an even layer of continuously flowing material bits on the working surface of a continuous conveyor means, which conveyor means is selectively advanceable in a predetermined direction, comprising a material flow-directing means, said material flow-directing means comprising a distribution head receiving said continuously flowing material bits; said distribution head being longitudinally, positionably, mounted on a mounting carriage, which carriage is transversely positionable over a predetermined expanse of said conveyor working surface, said distributor head having a dimension extending longitudinally along said conveyor working surface defined as one-third the distance defined by the longitudinal position extremes thereof on said mounting carriage; selectively reversible distributor carriage means connected to said distributor carriage, to continuously drive said carriage between respective transverse position extremes over said conveyor working surface; first control means effecting a reversal of said distributor carriage drive means upon each successive transverse position extreme of said carriage being effected; second control means effecting a longitudinal shift of said distributor head on said distributor head carriage, said longitudinal shift register being opposite the direction of advance of said conveyor means, and by a distance substantially equalling the longitudinal dimension of said distributor head; said longitudinal shift being effected upon said head being driven from an edge extreme home position to a first opposite transverse extreme, and upon said head being driven from said first opposite transverse extreme to a second opposite transverse extreme; and a third control means operable upon said distributor head being driven to a third opposite transverse extreme, to position a guide means into working relationship with said distributor head, to cause said head to follow a diagonal path back to said home position as said conveyor is advanced through a predetermined distance increment defined as four times the longitudinal dimension of said distributor head.

2. The material distribution apparatus of claim 1, wherein said first control means comprises a plurality of frame-mounted distributor head impact-activated control switches, each of said switches interconnected with a power source for a drive motor which positions said distributor carriage transverse of said conveyor work surface; each of said control switches being fixed-positioned for distributor head impact activation thereof at the conclusion of successive opposite transverse extreme excursions of said distributor head over said conveyor means working surface.

3. The material distribution apparatus of claim 2, wherein said plurality of control switches comprise a first frame-mounted control switch being activated by distributor head impact, upon said head being driven from home position to a first transverse extreme position; a second frame-mounted control switch being activated by distributor head impact, upon said head being driven to a next succeeding transverse extreme position; a third frame-mounted control switch being activated by said head being driven to a still next succeeding transverse extreme; and, a fourth frame-mounted control switch being activated by distributor head impact, upon said head being returned to said home position.

4. The material distribution apparatus of claim 3, with structure comprising conveyor drive means, and control means to engage said conveyor drive means, to advance said conveyor upon said distributor head completing third transverse excursion thereof across said conveyor, and to de-energize said conveyor drive means upon said distributor head being driven to said home position thereof.

5. The material distribution apparatus of claim 4, wherein said conveyor drive control means comprises frame-mounted distributor head impact-operated control switch means operably connected with said conveyor drive means to, respectively, effect energization and de-energization thereof.

6. The material distribution apparatus of claim 1, wherein the second one of said control means comprises frame impact-release trigger mechanisms carried on said distributor head mounting carriage, means forcibly loading said distributor head toward the home position defined longitudinal position extreme thereof on said distributor head mounting carriage; said trigger mechanism comprising a stop fact for engagement with said distributor head to define longitudinal shift positions thereof on said distributor head mounting carriage, and camming surface to permit passage of said distributor head over the trigger mechanisms as the distributor head is longitudinally positioned toward the home position defined longitudinal extreme on said mounting carriage.

* * * * *